United States Patent [19]

Gibson

[11] Patent Number: 4,679,661
[45] Date of Patent: Jul. 14, 1987

[54] MODULAR GEARLESS ELEVATOR DRIVE

[75] Inventor: William H. Gibson, Aurora, Colo.

[73] Assignee: Otis Elevator Company

[21] Appl. No.: 832,198

[22] Filed: Feb. 24, 1986

[51] Int. Cl.[4] .................................................. B66B 11/04
[52] U.S. Cl. ..................................... 187/20; 310/258; 254/362
[58] Field of Search ............................ 187/20, 27, 22; 254/362, 380, 266, 264; 308/5 R, DIG. 9, DIG. 11, 78.1, 40, 42; 310/258

[56] References Cited

U.S. PATENT DOCUMENTS

| | | | |
|---|---|---|---|
| 2,710,738 | 6/1955 | Wittberger | 254/362 |
| 3,484,934 | 12/1969 | Wightman | 310/258 |
| 3,518,468 | 6/1970 | Wightman | 310/258 |
| 4,076,989 | 2/1978 | Watson | 310/258 |
| 4,355,783 | 10/1982 | Tosato et al. | 187/20 |

Primary Examiner—Joseph J. Rolla
Assistant Examiner—Kenneth Noland
Attorney, Agent, or Firm—Gerald E. Linden

[57] ABSTRACT

The front endcap (10) and mounting bracket (26) for a motor are unitary for motor interchangeability. The endcap (10) has a disc-like portion (12) and a tubular boss (22) extending therefrom that receives in its bore the motor shaft (44) and bearings (68). A portion (50) of the motor shaft extends beyond the boss to receive a sheave (56), a rim portion (72) of which extends over the boss so that the sheave load is more in line with the bearings. Furthermore, the sheave may be bolted to the endcap boss for motor replacement.

3 Claims, 4 Drawing Figures

MODULAR GEARLESS ELEVATOR DRIVE

TECHNICAL FIELD OF THE INVENTION

The invention relates to elevator drives.

BACKGROUND OF THE INVENTION

U.S. Pat. No. 4,355,785 discloses a motor front endcap/sheave arrangement that accepts a variety of motors. This provides for so-called "modularity" of drives. Modularity also applies to the ability to use different sheave sizes with a particular motor.

DISCLOSURE OF THE INVENTION

It is an object of this invention to provide an improved modular gearless elevator drive.

According to the invention the front endcap and mounting bracket for a motor are unitary for motor interchangeability. The endcap has a disc-like portion and a tubular boss extending therefrom that receives in its bore the motor shaft and bearings. A portion of the motor shaft extends beyond the boss to receive a sheave, a portion of which is disposed over the boss so that the sheave load is more in line with the bearings. Furthermore, the sheave may be bolted to the endcap boss for motor replacement.

Other objects, features, and advantages of the present invention will become apparent in the light of the following description thereof.

BEST MODE FOR CARRYING OUT THE INVENTION

Generally speaking, an electrical motor (either AC or DC) comprises a tubular, nonrotating housing, a rear endcap closing off one end of the housing, a front endcap closing off the other end of the housing, and an axial, rotating shaft extending from the rear endcap through the front endcap.

Figure 1:
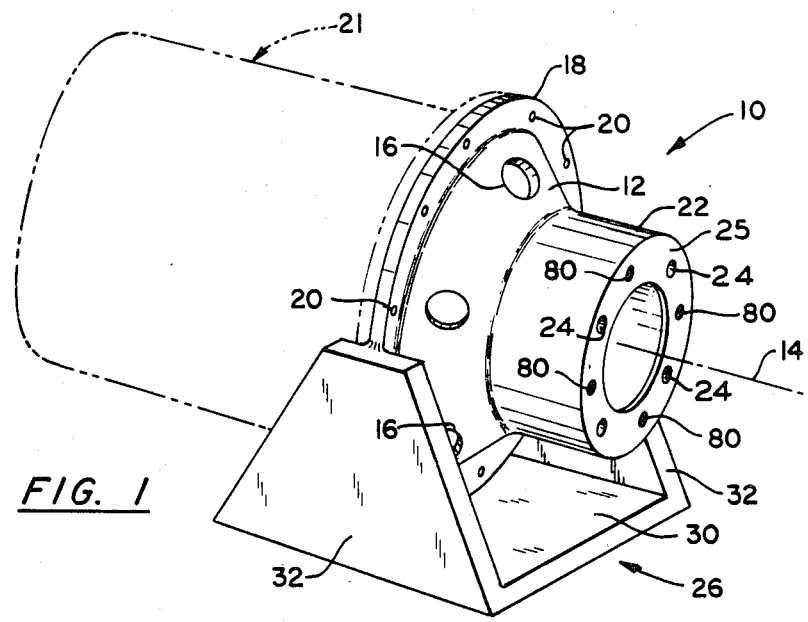
FIG. 1 is a perspective view of the modular motor front endcap of this invention.

FIG. 1 shows the modular front endcap 10 of this invention which is designed to receive various electrical motors. The endcap 10 comprises a concave disc-like portion 12 that is centered about a motor axis 14. Openings 16 are typically provided in the disc-like portion for motor ventilation. The outer edge of the disc-like portion is a flat annular flange 18, perpendicular to the axis 14. A plurality of holes 20 are provided in the flange 18 at regular intervals, parallel to the axis 14, for receiving, by bolting, an electrical motor 21 (shown in phantom). A tubular boss 22 extends outwardly from the center of the disc-like portion 12, coaxial to the axis 14. A plurality of holes 24 are provided in the front surface 25 of the boss 22, which is perpendicular to the axis, at regular intervals parallel to the axis 14. The holes 24 extend entirely through the endcap into the motor region.

A mounting bracket 26 supports the endcap 10 and attached motor 21. The bracket 26 comprises a flat base portion 30 which is slightly wider than the circumference of the disc-like portion 12, and flat perpendicular side portions 32 which are disposed on either side of the base portion 30. The side portions 32 are attached at their tops to diametrically opposed portions of the extreme outer surface of the flange 18.

Collectively, the endcap 10 and bracket 26 are termed the "center frame", and are preferably cast as one piece. The motor-mounting surface of the flange 18 is machined flat, perpendicular to the axis 14. The inside bore of the boss 22 is machined cylindrical for a short portion 35 of its length, extending inward from its front surface 25 and then is machined cylindrical at a slightly greater diameter for the remaining portion 36 of its length. This forms a stop 37 at the front opening of the boss bore.

Figure 2:
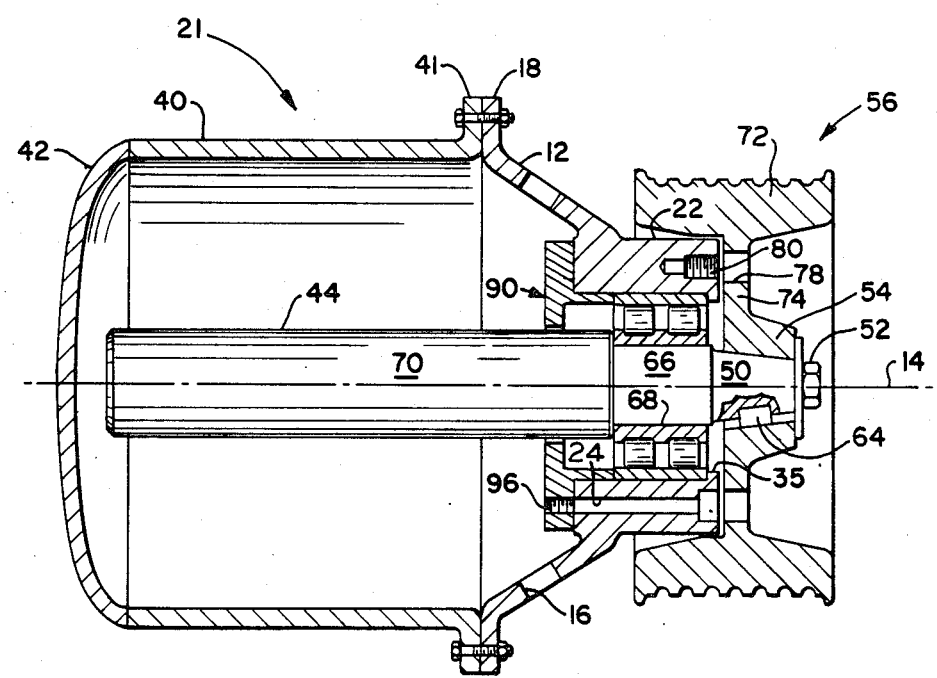
FIG. 2 is a cross-sectional view of the modular gearless elevator drive arrangement of this invention, assembled.

FIG. 2 shows in cross-section the endcap 10 of this invention with a typical motor attached, but without the mounting bracket for descriptive simplicity.

Figure 3:
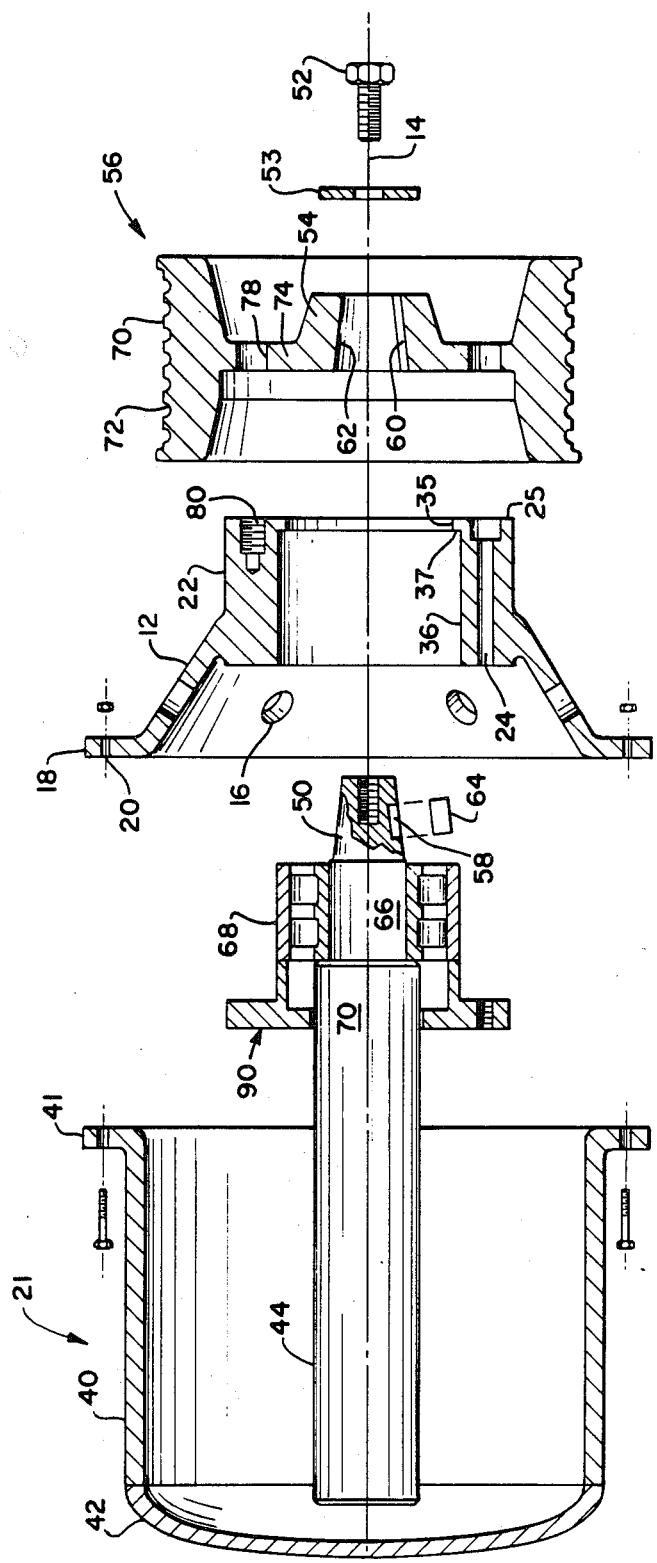
FIG. 3 is a cross-sectional view of the modular gearless elevator drive arrangement of this invention, unassembled.

FIG. 3 is an exploded view of FIG. 2. In the main, hereinafter, FIG. 2 is discussed. It should be understood that a variety of motors having the same housing outer diameter are readily attached to the modular endcap 10.

Figure 4:
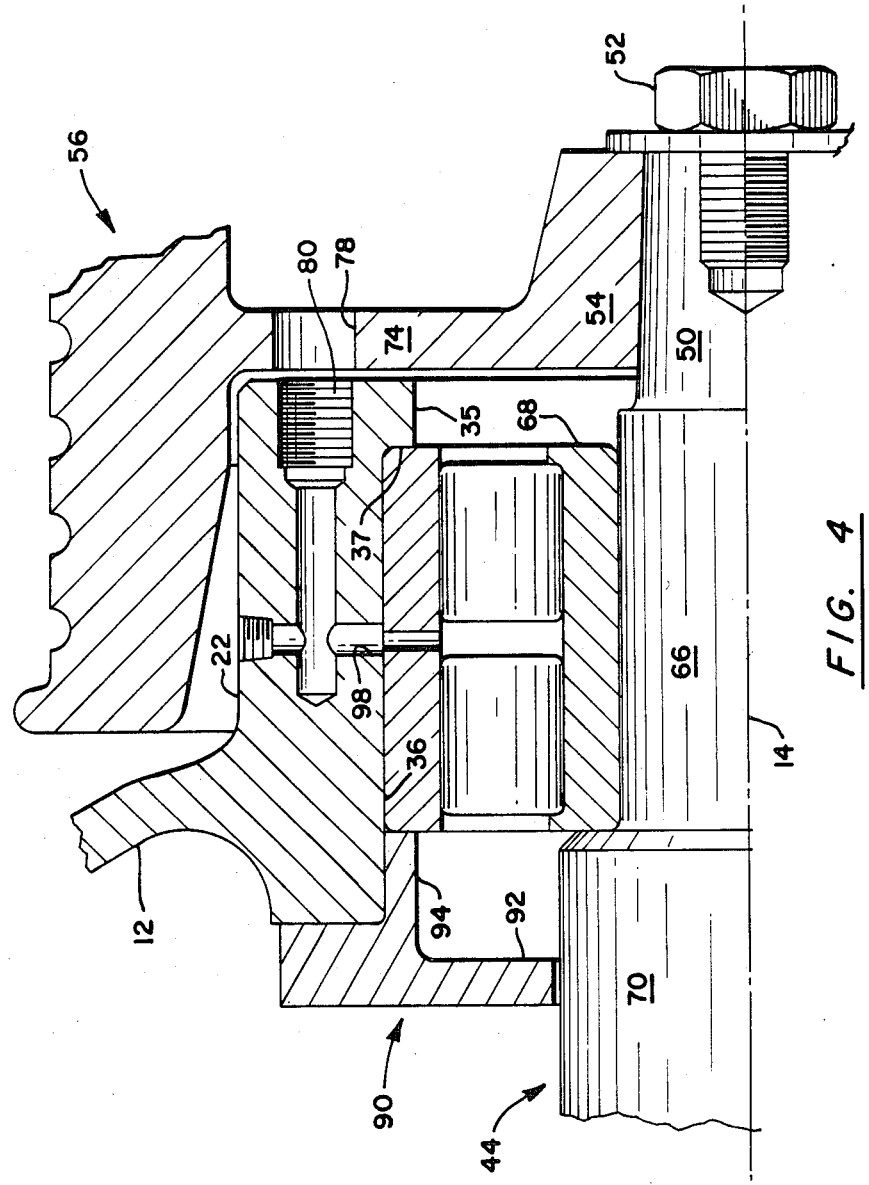
FIG. 4 is a cross-sectional view of details of the invention.

FIG. 4 shows in greater detail certain portions of the invention.

The motor 21 comprises a tubular housing 40 having a flange 41 (or flangeless end surface) for attachment with the endcap flange 18, a rear endcap 42, and an axial shaft 44 extending out the front of the housing. The windings and pole pieces of the motor are not germane to the invention, and are omitted for descriptive simplicity. The portion of the shaft 44 extending out of the housing is shaped as follows, from its extreme end inward.

The endmost portion 50 of the shaft 44 extends past the boss 22. It is internally threaded to receive a bolt 52 that cinches down the hub 54 of a sheave 56 onto its tapered outside diameter.

The next innermost portion 66 of the shaft 44 is cylindrical, of slightly greater diameter than the portion 50, and is disposed substantially within the boss 22. This portion of the shaft is termed the "bearing portion" of the shaft and corresponds positionally to the above-mentioned cylindrical bore position 36 of the boss 22 when the motor is assembled to the endcap. A double row roller bearing 68 is press fit on the portion 66 of shaft 44. The outer race of the bearing 68 bears against the stop 37 when the motor is assembled to the endcap.

The next innermost portion 70 of the shaft is cylindrical, and slightly larger in diameter than the bearing portion 66. This provides a stop against which the inner race of the bearing 68 bears against when the bearing is inserted onto the shaft.

The remainder of the shaft is disposed within the motor itself, in a conventional manner. For instance, a bearing (not shown) is disposed in the rear endcap to support the other end of the shaft 44.

The sheave 56 comprises the aforementioned inner hub portion 54, an outer rim portion 72, and an intermediate disc portion 74 connecting the hub 54 to the rim portion 72.

The disc portion 74 of the sheave 56 is essentially flat, circular, and parallel to the front surface 25 of the boss, with very little running clearance therebetween. A plurality of holes 78 are disposed in the disc portion 74 in alignment with the plurality of holes 24 in the boss 22.

The rim portion 72 of the sheave 56 extends over the boss 22 so that the sheave load is nearly in line with the bearing 68. Notice also that in a region at the front end of the boss 22, the running clearance between the rim portion 72 and the outside diameter of the boss is extremely small. The reason for this tight running clearance will be evident hereinafter.

When disassembling the motor from the endcap (e.g., for replacing the motor in an elevator installation), it may be desirable to leave the sheave 56 in place, with respect to the endcap 10. This is conveniently achieved by inserting bolts (not shown) through the holes 78 into a threaded front portion 80 of the boss holes 24. This secures the sheave 56 against the boss 22 in a very concentric manner, due to the aforementioned tight running clearance between the rim portion 72 and the boss outside diameter. When reassembling the motor to the endcap, any misalignment is accounted for by the taper on the shaft portion 50.

It was mentioned that the front side of the outer race of the bearing 68 is snug against the stop 37 in the boss bore. The back side of the outer race of the bearing 68 is held snugly in the boss in the following manner.

An annular retention ring 90 is loosely fitted over the motor shaft 44 prior to press fitting the bearing 68 thereon. The retention ring 90 has a disc portion 92 with a hole in its center slightly larger than the shaft portion 70. This keeps the ring 90 centered on the shaft. An annular flange portion 94 of the ring 90 extends towards the bearing 68 from the disc portion 92. The radius of the flange 94 matches the radius of the bearing outer race. Threaded holes 96 are provided through the ring 90 near its perimeter and are located in correspondence with the bore holes 24.

Since the ring 90 is free to spin on the motor shaft 44 during assembly of the motor to the endcap, alignment pins (not shown) are temporarily inserted through the sheave holes 78 (if the sheave is in place) and through the boss holes 24 to engage the ring holes 96. The alignment pins would then be withdrawn, one at a time, and replaced by long bolts (not shown) that sit recessed within the boss 22 and engage the ring holes 96. When these bolts are tightened down, the flange 94 bears firmly against the bearing outer race. Thus, the bearing 68 is locked at both faces of its outer race, and at one face of its inner race. It was not deemed necessary to lock the other face of the inner face. Thus, the shaft bearing in the rear endcap can "float".

Lubrication of the bearing 68 is also achieved via the boss holes 24 and the sheave holes 78 (if the sheave is in place). To this end a passageway 98 extends radially from the boss hole 24 to the boss bore portion 36, in line with the bearing 68.

Thus, it is may be appreciated that the boss holes 24 serve three purposes; securing the sheave for motor replacement, locking the bearing 68 for motor assembly, and lubricating the bearing 68. Regarding the actual number of the various holes, there may be eight sheave holes 78, eight boss holes 24, and four ring holes 96 so that various purposes may be achieved simultaneously. Since only four of the boss holes 24 need extend completely through the boss 22 for a bolt to engage the locking ring 90, the other four of the boss holes 24 may comprise only the threaded portion 80 extending part way into the boss, as shown in FIGS. 1, 2, and 3, and the passageway 98 would be associated only with those (threaded portion 80) holes.

In the aforementioned U.S. Pat. No. 4,355,785 the interchangeable motors come complete with endcaps. As is evident in the present invention, the motor, per se, comes without a front endcap. Therefore, for shipping purposes a plastic front endcap sized like the disc-like portion 12, flange 18 and boss 22 of the endcap 10 is appropriate.

It should be understood that various changes may be made to the invention without departing from the spirit and scope thereof.

I claim:

1. A drive arrangement including a motor and a sheave wherein:

the front endcap (10) of the motor comprises a concave disc-like portion (12) that is centered about the motor axis and a tubular boss (22) extending axially outwardly from the center of the disc-like portion (12); wherein the boss (22) has a cylindrical bore portion (36), a front surface (25), and threaded holes (80) extending axially inwardly from the front surface (25) into the boss (22);

the sheave (56) comprises an outer rim portion (72) connected via an intermediate disc portion (74) to an inner hub portion (54); wherein holes (78) are provided axially through the intermediate disc portion (74) in ultimate alignment with the threaded holes (80) when the sheave (56) is assembled to the boss (22) and wherein the outer rim portion (72) extends over the boss (22) with a tight running clearance therebetween so that the sheave (56) and the front endcap (10) are held in close axial alignment when the sheave (56) is bolted to the front endcap (10) via bolts through the holes (78) in the sheave (56) and the threaded holes (80) in the boss (22);

the motor (21) comprises a tubular housing (40) and a shaft (44) extending axially out the front of the housing (40); wherein a first portion (50) of the shaft (44) is disposed to extend past the boss (22) for receiving the hub portion (54) of the sheave, and wherein a second portion (66) of the shaft (44) is disposed substantially within the boss (22) in correspondence with the cylndrical bore portion (36) of the boss (22) for receiving a bearing (68) between the second shaft portion (66) and the cylindrical bore portion (36).

2. A drive arrangement according to claim 1, comprising:

axial holes (24) extending axially inwardly from the front surface (25) completely through the boss (22);

a stop (37) formed inside the front surface (25) of the boss (22) and of a lesser dimension than the cylindrical bore portion (36); and a retaining ring (90) disposed inside the boss and urging the bearing (68) against the stop (37) via bolts inserted through the axial holes (24) into the retaining ring (90).

3. A drive arrangement according to claim 2, wherein:

radial holes (98) are disposed in the boss in circumferential alignment with the threaded holes (80), and extend from the threaded holes (80) to the cylindrical bore portion (36) so that the bearing (68) may be lubricated via the exit point of the threaded holes (80) on the front surface (25) of the boss (22).

* * * * *